UNITED STATES PATENT OFFICE.

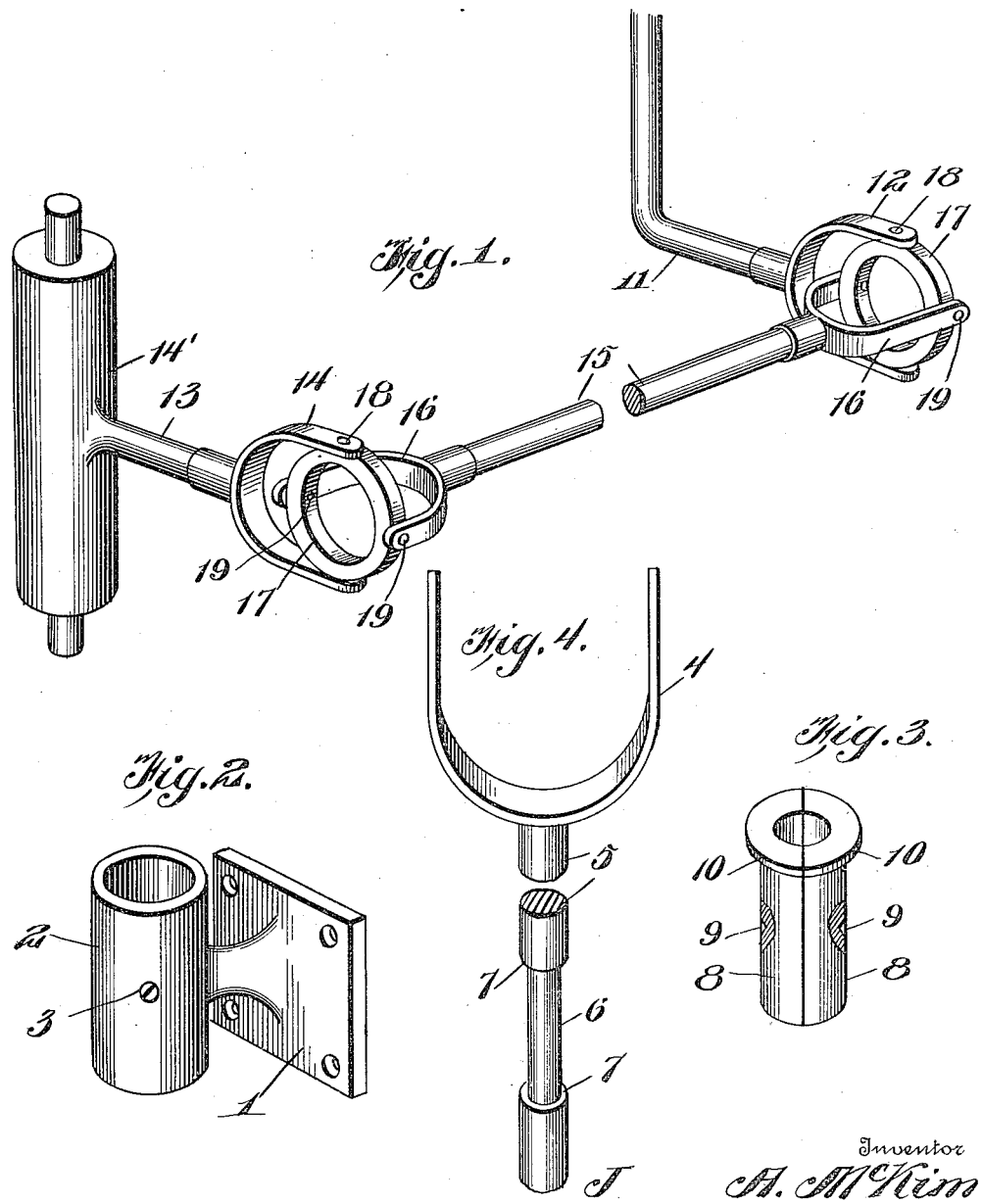

JAMES A. McKIM, OF GREENSBURG, INDIANA.

HEAD-LAMP CONTROL.

1,141,809. Specification of Letters Patent. Patented June 1, 1915.

Application filed May 9, 1914. Serial No. 837,466.

*To all whom it may concern:*

Be it known that I, JAMES A. McKIM, a citizen of the United States, residing at Greensburg, in the county of Decatur and State of Indiana, have invented new and useful Improvements in Head-Lamp Controls, of which the following is a specification.

This invention relates to head lamp controls for motor vehicles, the object in view being to provide a simple lamp turning device applicable to any motor vehicle and which will cause the head lamp or lamps to turn at angles corresponding with the angles assumed by the steering wheels so as to direct the rays of light along the path to be followed by the machine. The device may be used either in connection with a single head lamp or twin head lamps as are now commonly used.

With the above and other objects in view, the invention consists in the novel construction, combination and arrangement of parts, as will be hereinafter more fully described, illustrated and claimed.

In the accompanying drawings: Figure 1 is a perspective view of the head lamp control of this invention. Fig. 2 is a detail perspective view of the lamp shaft bracket. Fig. 3 is a similar view of the shaft bearing. Fig. 4 is a detail view of the lamp shaft and fork.

The device of this invention comprises a bracket having an attaching base flange 1 adapted to be secured to the forward end of one of the side frame bars of the chassis of a motor vehicle. The bracket also comprises an upright bearing holding sleeve 2 of any suitable length provided with a set screw 3 passing through the side thereof, the purpose of which will appear.

The lamp holding fork 4 is provided with a downwardly extending lamp shaft 5 and this shaft is reduced as shown at 6, forming annular shoulders 7 arranged in spaced relation to each other. A diametrically divided sectional bearing for the shaft 5, comprises the twin sections 8 each of which is provided with a notch 9 to receive one of the set screws 3 above referred to. Each section 8 is further provided at its upper extremity with a supporting flange 10 adapted to rest against the top edge of the sleeve 2 of the bracket A. The upper annular shoulder 7 bears against the top of the bearing B while the lower annular shoulder 7 rests under the bearing B thus preventing undue longitudinal movement of the shaft 5 while permitting it to freely turn. The sectional bearing B is first placed around the reduced portion 6 of the shaft 5 and then said parts are inserted into the upper end of the sleeve 2 of the bracket. After this the sections 8 are held by tightening the screws 3. On its lower end the shaft 5 is provided with an angular crank arm 11 provided with terminal fork arms 12 preferably arranged in vertical alinement with each other. A crank arm 13 is also connected to the vertical portion 14' of one of the steering knuckles of the motor vehicle and is provided with terminal fork arms 14 at its outer extremity, said fork arms being also preferably arranged in vertical alinement with each other.

Connecting the two crank arms 11 and 13 is a connecting rod or link 15 provided with the terminal fork arms 16 and 17 all of which are arranged in a common plane as shown in Fig. 1 and at right angles to the fork arms 12 and 14 above described. Universal connecting elements 17 shown in the form of rings are pivotally connected to the fork arms 12 and 14 by the vertical pivots 18 and to the fork arms 16 by the horizontal pivots 18. This allows the swinging movement of the crank arm 13 to be imparted to the crank arm 11 for the purpose of turning the lamp in accordance with the angle given the steering wheel and at the same time it permits the up and down movements of the lamps and the shafts 5 which are carried by the frame of the machine, thus compensating for the action of the body supporting springs interposed between the body supporting frame and the axles of the machine. Where two head lamps are employed the connections referred to will be duplicated at both sides of the machine. The mechanism is simple and economical in construction and manufacture, is not liable to get out of order and will fully take care of all the necessary movements above referred to.

What I claim is:—

In automatic head lamp control, a vertical oscillatory lamp shaft having a reduced journal portion terminating in annular shoulders in spaced relation to each other, a bearing bracket for said shaft, a diametrically divided sectional bearing embracing said journal portion of the lamp shaft between said shoulders and insertible in said bracket, retaining means for said sectional bearing, and automatically controlled means for oscillating said lamp shaft and admitting of the relative movements of the body and running gear of the vehicle.

In testimony whereof I affix my signature in presence of two witnesses.

JAMES A. McKIM.

Witnesses:
 BRIAN A. TURNER,
 CARL R. SCHEIDLER.

Copies of this patent may be obtained for five cents each, by addressing the "Commissioner of Patents, Washington, D. C."